April 30, 1957   F. MORTON ET AL   2,790,834
SEPARATION OF PHENOLS FROM HYDROCARBONS
Filed July 7, 1953
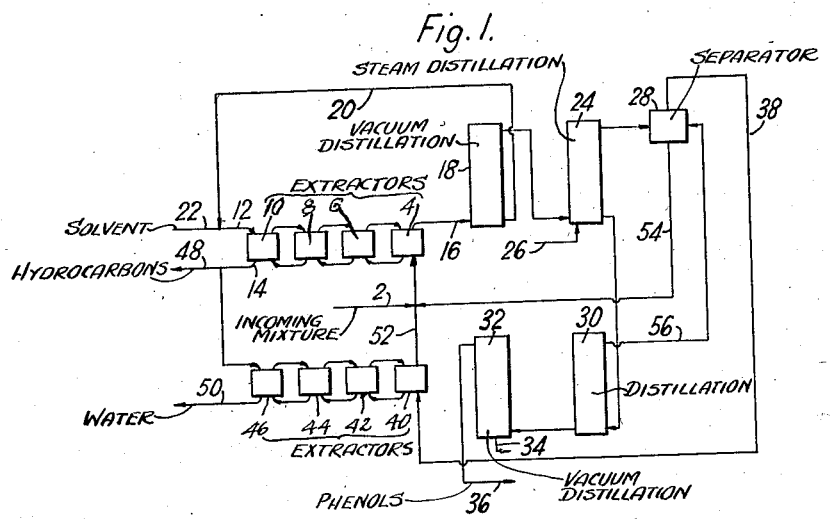
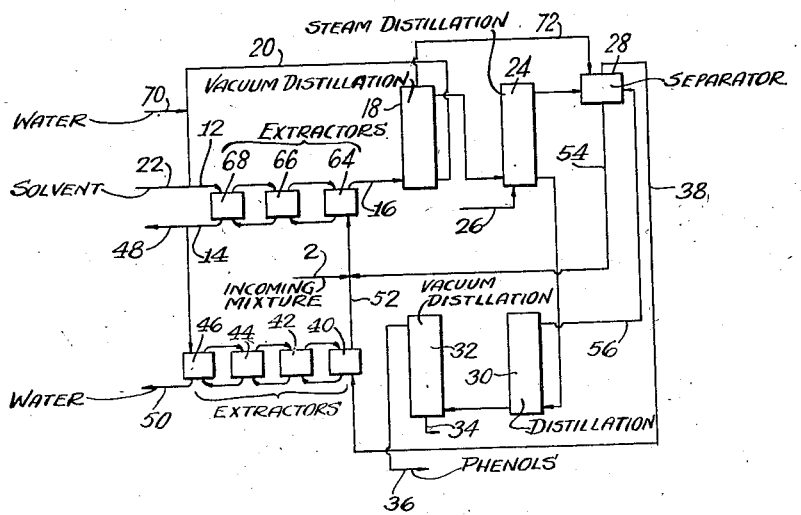
Inventors
Frank Morton
Alfred Coleman Cumming
By
Bailey, Stephens & Huettig
Attorneys

United States Patent Office 2,790,834
Patented Apr. 30, 1957

2,790,834
SEPARATION OF PHENOLS FROM HYDROCARBONS

Frank Morton, Warley, England, and Alfred Paton Coleman Cumming, Giffnock, Scotland, assignors to The Midland Tar Distillers Limited, Birmingham, England Application July 7, 1953, Serial No. 366,544

8 Claims. (Cl. 260—627)

This invention relates to the separation of phenols from hydrocarbons with which they are mixed. By the term "phenols" as used herein we mean not only what is commonly called phenol ($C_6H_5OH$) but also those compounds which contain one or more hydroxyl groups attached to a mononuclear aromatic nucleus and homologues of these compounds with alkyl radicals attached directly to the aromatic nucleus.

An object of the invention is to provide an improved process for recovering substantially pure phenols from mixtures thereof with hydrocarbons.

Another object is to recover hydrocarbons substantially free of phenols from mixtures of hydrocarbons of phenols.

A further object is to procure an improved solvent-extraction process for phenols.

The separation process of our invention may be carried on with the primary object of obtaining substantially pure phenols and then is particularly applicable to starting materials in which the phenols have been synthetically produced, e. g. by the oxidation of cumene. The separation may also be carried on with the primary object of removing phenols from hydrocarbons which are desired as pure or substantially pure products. In particular the invention may then usefully be applied to fractions derived from the distillation of coal tar; these fractions commonly contain coal-tar bases, which are removed with the phenols.

The recovery of phenols from hydrocarbons is an important industrial process. As a general rule both the phenols and the hydrocarbons boil at temperatures below 240° C., and the invention is primarily applicable to mixtures boiling below 240° C. Hitherto such mixtures have usually been subjected to chemical extraction of the phenol-hydrocarbon mixture with caustic soda solution, followed by decomposition of the aqueous sodium phenoxide solution by carbon dioxide. The process has several disadvantages, mainly connected with the conversion of the sodium carbonate liquors back to a caustic solution for reuse, and attempts have been made in recent years to develop processes based upon liquid-liquid extraction and azeotropic or extractive distillation. The Metasolvan processes, introduced in Germany during 1939–45, is a solvent-extraction process employing aqueous methanol. Initially, the process was applied to low-temperature carbonisation oils, of low aromatic content, for the purpose of producing a high-grade diesel oil.

According to the present invention glycerol, ethylene glycol, diethylene glycol or tri-ethylene glycol is used as a preferential solvent for one or more phenols contained in admixture with a hydrocarbon or hydrocarbons. In the absence of bases or other compounds extracted with the phenols by reason of preferential solubility, the phenols extracted by the solvent can be separated as substantially pure products from the solvent by distillation.

It is economically important to recover the solvent for re-use, and the recovery can most conveniently be effected by fractional distillation. Accordingly, the choice of the best solvent for economic working depends on the boiling point of the phenol or phenols in question, since this point should be sufficiently different from that of the solvent to allow the separation to take place without difficulty. Phenol itself has a boiling point of 181° C. and as ethylene glycol boils at 197° C. one of the other solvents is preferred. In accordance with the nature of the process, account may also have to be taken of the boiling point or points of the hydrocarbon or hydrocarbons.

The preferred solvents for phenol itself are glycerol and tri-ethylene glycol because of their high boiling points and the invention will primarily be described in connection with them.

The extract invariably contains some hydrocarbon as well as phenol. By using glycerol according to the invention, a mixture of phenols and hydrocarbons containing, after removal of the glycerol, no more than 10% hydrocarbon can be obtained, and by a subsequent distillation treatment which forms part of the invention the hydrocarbon content of the phenols can be reduced to less than 0.1%, thus yielding (in the absence of bases) a final phenol product of equality at least equal to and often better than that obtained by the caustic soda process.

The extraction is preferably effected with counter-current flow of the solvent and the charge under treatment, and extraction in several stages is necessary in order to produce a satisfactory extract containing very little hydrocarbon. The number of stages depends upon the ratio of the solvent to the hydrocarbons (which will be called the solvent ratio), the number of stages decreasing as the solvent ratio increases. The number of stages depends also on the temperature. Any temperature up to 100° C. may be used, but good results may be obtained at atmospheric temperature, and this will be assumed in the further description of the invention. The number of stages further depends on the particular solvent used, and on the composition of the original mixture, increase in the phenol content of the charge increasing the number of stages required.

Glycerol is preferably used in the anhydrous state, although up to 5% water can be tolerated. The addition of water to glycerol as a solvent for the separation of phenols is deleterious for two reasons. The presence of water both increases the solubility of the hydrocarbons in the extract and the number of stages required for any given separation. Tri-ethylene glycol, however, is preferably used in admixture with water, and the optimum mixture consists of 63% tri-ethylene glycol and 37% water. Glycerol presents the advantage that the extract contains a smaller percentage of hydrocarbon or hydrocarbons, and therefore less heat is required in the subsequent distillation. Tri-ethylene glycol presents the advantage that less of it need be used and that the plant required is smaller.

The distillation of the extract may take place in batch or continuous fashion. Preferably the extract is first distilled under vacuum to recover all the solvent, which is returned to the extraction plant.

Substantially pure phenol or phenols may be obtained from a starting material free from bases if the phenol-containing extract is distilled to remove the solvent from the extract, and the extract then subjected to steam distillation to yield, as one fraction, a mixture of phenols and water and as the other fraction a mixture containing substantially all the hydrocarbons, together with the bulk of the water and some phenols.

If the starting material is a coal-tar fraction or otherwise such as to contain bases, substantially all the bases will be found in the extract and the final phenol product will contain most of these bases.

Two such processes will now be described in detail with reference to the accompanying drawings, in which Figures 1 and 2 are diagrammatic flow sheets.

Figure 1 illustrates a process using glycerol as a solvent for the extraction of a mixture of phenols from a mixture of 30% mixed phenols and 70% hydrocarbon. The mixed phenols themselves being made up of 45% phenol, 15% o-cresol, 21% m-cresol and 14% p-cresol, the remainder being higher phenols, the hydrocarbons boiling in the range 170 to 201° C. and obtained from high-temperature carbonisation oil and being predominately aromatic. To extract this mixture of phenols a solvent ratio of 1:2 and four extraction stages are preferred. The initial charge is introduced through a pipe 2 to the first of a battery of counter-current extractors 4, 6, 8 and 10, where it comes into contact with glycerol introduced through a pipe 12 to the last extractor 10, flowing from there to the extractors 8, 6 and 4. The charge introduced becomes progressively leaner in phenols until it leaves 10 substantially free of any phenols, through a pipe 14. The solvent leaves the extractor 4 through a pipe 16 containing in solution the phenols and a small quantity of hydrocarbons. The pipe 16 leads to a vacuum distillation vessel 18. Distillation under reduced pressure at this stage is recommended, since this reduces any tendency to decomposition of the solvents remaining in the lower parts of the vessel 18. Glycerol leaves through a pipe 20 and is returned to the extractor 10. Any glycerol lost in the process is made up by adding the required quantity to maintain the solvent ratio through a pipe 22.

The distillate containing over 90% of mixed phenols and less than 10% hydrocarbons leaving the top of the vessel 18 flows to a steam distillation vessel 24. Steam is introduced through a pipe 26 in an amount by weight equal to between 3 and 4 times the weight of the distillate. The distillate, consisting mainly of water and also containing phenol together with nearly all the hydrocarbons, is led to a separator 28. The liquid leaving the vessel 24 flows to a distillation column 30. This liquid is a mixture of phenols and water and distillation removes all the water, together with a small quantity of phenols. This mixture is returned to the separator 28 through a pipe 56. The pure phenol is then subjected to a further vacuum distillation process in a vessel 32. The residue leaves through a pipe 34, and the pure phenols containing less than 0.1% hydrocarbon oils through a pipe 36.

In the separator 28 two fractions are formed, namely an aqueous fraction containing 3% or less phenols, and a phenol-rich fraction containing over 20% hydrocarbon oils. The first fraction leaving through the pipe 38 may be treated as a waste liquor, but if, as is generally the case, the disposal of it causes difficulty it may be subjected to a solvent-extraction process in a secondary plant in which hydrocarbon oils from the main solvent-extraction plant are used as the solvent. The secondary solvent-extraction plant consists of four extractors 40, 42, 44 and 46 through which the aqueous fraction flows in countercurrent with hydrocarbons from a pipe 14. Hydrocarbons must be withdrawn through a pipe 48 to prevent the build-up of hydrocarbons in the system. In the same way water introduced into the system through the pipe 26 must be removed from the system through a pipe 50. The solution of phenols in hydrocarbons leaving the extractor 40 flows through a pipe 52 to be blended with the initial charge entering through the pipe 2. The phenol-rich fraction leaving the separator 28 through the pipe 54 is also blended with the initial charge. The phenols-hydrocarbons mixture which is blended in must be taken into account in determining the quantity of the solvent required to give the solvent ratio of 1:2.

Tri-ethylene glycol is suitable for extracting mixed phenols containing less phenol and more cresols. Glycerol is less suitable for extracting such a mixture since high solvent-ratios and large numbers of stages would be required owing to the lesser solvent power of glycerol for this mixture of phenols.

Figure 2 illustrates a process using aqueous tri-ethylene glycol as the solvent for the extraction of mixed phenols made up of 25% phenol, 20% o-cresol, 29% of m-cresols and 16% p-cresol, the remainder being higher phenols, and the hydrocarbons boiling in the range 170 to 201° C. obtained from high-temperature carbonisation oil and being predominantly aromatic. Similar reference numerals refer to similar parts in the two figures and accordingly it will be seen that the process is essentially similar to that already described; however, three stages only are needed for the extraction of the phenols, the charge passing successively from a pipe 2 through three extractors 64, 66 and 68 finally leaving through pipe 14. A solvent ratio of 1:1 is used the solvent being introduced through pipe 12. The extract of phenols in solvent leaves extractor 64 through a pipe 16 and is distilled as before in a vacuum vessel 18 and a steam distillation vessel 24.

The vacuum distillation of the extract produces three fractions, one being the distillate, which is a mixture of phenols and hydrocarbons containing about 16% hydrocarbons, and flows to the vessel 24. The next fraction is dry triethylene glycol, which leaves through a pipe 20 and is returned to the first extractor, being diluted with water from a pipe 70 to produce a 37% aqueous solution. Due to the formation of an azeotropic mixture the third fraction consists of water containing about 3% phenols, and this is passed through a pipe 72 to the separator 28 which receives the aqueous fraction from the steam distillation. The subsequent treatment of the phenols-hydrocarbons fraction and the fractions obtained from the separator is the same as when glycerol is used. As in the previous process the mixture of phenols is obtained containing less than 0.1% of liquid hydrocarbons.

When phenol itself, as distinct from mixed phenols, is being extracted from hydrocarbons the purity of the extract is higher than when mixed phenols are being extracted, and may be as high as 99% before distillation, if glycerol is used as the solvent. For example, phenol can be extracted from an initial charge consisting of 30% phenol, 45% aromatic hydrocarbons and 25% paraffin and naphthene hydrocarbons to yield a product of 99% purity when using a solvent ratio 1:1 and 3 stages.

The processes have been described as if they were continuously operating, but they can be made semi-continuous by working one or more of the distillation in batch fashion. In this way one of the distillation columns 18 and 32 can be dispensed with, and similarly one of the vessels 24 and 30 can be omitted.

When the starting material is a coal tar fraction the process may be carried on in substantially the same way, but the phenols will be recovered mixed with bases. This, however, may be immaterial if the hydrocarbons recovered through the pipe 48 form, for example, a neutral oil suitable for use as a high-grade diesel oil or otherwise.

We claim:
1. A process for separating at least one phenolic compound of the phenols group from a mixture thereof with at least one hydrocarbon which comprises subjecting such mixture to solvent extraction with a solvent selected from the group consisting of glycerol, ethylene glycol, di-ethylene glycol and tri-ethylene glycol to obtain an extract rich in the phenolic compound, distilling the extract to separate the solvent from the extract, subjecting the extract to steam distillation to obtain a distillate and a distillation residue of a mixture of the phenolic compound and water and then distilling water from the latter mixture.

2. A process according to claim 1 in which the distillate from the steam distillation is separated into two fractions, the first of which is a rich solution of the phenolic compound in the hydrocarbons and the second of which is an aqueous fraction containing the phenolic compound, recycling said first fraction to the incoming mixture to be subjected to the solvent extraction, treating the second fraction with hydrocarbons obtained in the extraction to extract the phenolic compound therefrom and recycling the resulting mixture of the phenolic compound and the hydrocarbons to the incoming mixture to be subjected to the solvent extraction.

3. A process according to claim 1 in which said mixture is substantially free from bases and other compounds preferentially soluble in the solvent.

4. A process according to claim 1 in which a substantial proportion of the phenolic constituent of said mixture comprises phenol and the solvent is glycerol.

5. A process according to the claim 4 in which the glycerol at most contains 5% of water.

6. A process according to claim 1 in which a substantial proportion of the phenolic constituent of said mixture comprises at least one cresol and the solvent is aqueous tri-ethylene glycol.

7. A process according to claim 6 in which the aqueous tri-ethylene glycol contains about 63% of tri-ethylene glycol.

8. A process according to claim 1 in which the extraction is carried on continuously with countercurrent extraction of the phenolic compound from said mixture.

References Cited in the file of this patent

UNITED STATES PATENTS

| | | |
|---|---|---|
| 2,240,727 | Vesterdal | May 6, 1941 |
| 2,368,931 | Leum et al. | Feb. 6, 1945 |
| 2,573,990 | Sandborn | Nov. 6, 1951 |

OTHER REFERENCES

Cumming et al.: Journal of Applied Chemistry, 2, pgs. 314 to 323, published June 1952.

Cumming: Journal of Applied Chemistry, vol. 3, part 3, pgs. 98–106, published March 1953.